UNITED STATES PATENT OFFICE.

NOAH B. RADABAUGH, OF CLEVELAND, OHIO, ASSIGNOR TO THE PHOENIX HARDENING EQUIPMENT COMPANY, OF CLEVELAND, OHIO, A CORPORATION OF OHIO.

PROCESS OF MAKING CARBONIZING MATERIAL.

1,338,841.  Specification of Letters Patent.  Patented May 4, 1920.

No Drawing.  Application filed July 5, 1917. Serial No. 178,664.

*To all whom it may concern:*

Be it known that I, NOAH B. RADABAUGH, a citizen of the United States, residing at Cleveland, in the county of Cuyahoga and State of Ohio, have invented certain new and useful Improvements in and Relating to Processes of Making Carbonizing Material, of which the following is a specification.

This invention relates to a composition of matter particularly adapted for carbonization purposes.

One object of the invention is to provide an improved process of making a carbonizing composition, whereby the elements thereof are intimately mixed and the energizing ingredients thoroughly impregnated into the pores of the carbonaceous material.

Another object of the invention is to provide a novel process of making a composition of matter of this character economically.

Another object of the invention is to provide an improved process of making carbonizing material which insures the thorough and uniform energizing of the element or elements and which permits the energizing ingredients to be used over again.

These and other objects of the invention will be apparent from the following disclosure.

In carrying out my improved process, I first thoroughly mix or dissolve in a suitable holder or tank the following ingredients in approximately the proportions stated below: water, 137 gallons; sodium nitrate, $NaNO_3$, $7\frac{1}{2}$ lbs.; soda ash, $Na_2CO_3$, 30 lbs.; salt, $NaCl$, 15 lbs.; calcium carbonate, $CaCO_3$, $6\frac{3}{4}$ lbs.; potassium chlorid, $KCl$, 12 oz. In forming this solution I preferably add each element to the water separately in the order named and stir and agitate the solution until the ingredients are entirely dissolved.

I next impregnate in the solution a carbonaceous material consisting of 400 pounds of charcoal and 200 pounds of petroleum coke, which preferably have first been thoroughly mixed together in any desired manner. Before placing the carbonaceous material in the solution, I prefer to grind and screen it to the desired size according to the circumstances and conditions of ultimate use. This grinding operation is preferably performed prior to the impregnation of the material in the solution, as it conditions the charcoal and coke for more efficient and uniform impregnation by the energizing solution, since more of its pores will be exposed to receive and permit intimate mixture and infusion thereof. I prefer to use a hardwood charcoal as I have found it to give better results. The carbonaceous material is left to soak in the solution for about 24 hours to insure impregnation and filling of the pores of the charcoal and coke with the energizing solution.

I next drain off the surplus liquid from the carbonaceous material. This may be done by opening a suitable valve in the bottom of the holder or tank or transferring the carbonaceous material to a suitable draining device, such as a trough. In practice I have found it takes about six hours for the surplus liquid material to drain from the carbonaceous material.

I next heat the carbonaceous material to drive off and eliminate all the remaining water and liquid contained in the material. For this purpose I apply a heat of 1000° to 1200° F., which will cause evaporation of all water, without transforming any of the remaining ingredients in the solution into a gas. For the purpose of readily and economically applying heat to the material, I place it in a suitable furnace of the muffle or semi-muffle type and then stir, mix or agitate, either continually or periodically, the material to uniformly subject all portions thereof to the heat. By this step of my process I am enabled to drive off and entirely eliminate or separate the water used to form the solution from the remaining ingredients and to intimately and thoroughly impregnate every particle of the carbonaceous material with the ingredients, constituting the energizing material, in an unchanged condition. In carrying out my process I have found that if the material is placed in a muffle or semi-muffle furnace and heat having a temperature of 1000° to 1200° F. is applied thereto for thirty minutes and the material stirred or thoroughly mixed approximately every five minutes, that all portions of the material can be uniformly heated and all the water evaporated.

I finally remove the material from the furnace and allow it to cool. Thereafter it may be used or placed in suitable receptacles or packages for storing or transportation purposes.

To those skilled in this art, many alterations therein and widely differing embodiments and applications of my invention will suggest themselves, without departing from the spirit and scope thereof. My disclosures and the description herein are purely illustrative and are not intended to be in any sense limiting.

For instance, the amount of salt may, if desired, be reduced or it may be omitted entirely; but in so doing, I prefer to increase the amount of soda ash in proportion to the amount of salt omitted. Also, I have found in the practice of my invention that the calcium carbonate can be omitted from the solution. However, when this ingredient is omitted, the material when heat treated has to be subjected to a higher degree of temperature or to the same temperature for a longer period of time. Again, I have found that the coke can be omitted without affecting the composition of matter, since its chief function is to prevent the charcoal from burning and crumbling when the composition of matter is ultimately used for carbonization.

What I claim is:

1. The herein described process which consists in impregnating a carbonizing material in an energizing liquid solution containing sodium nitrate, soda ash and potassium chlorid.

2. The herein described process which consists in impregnating a carbonaceous material in an energizing liquid solution, sodium nitrate, soda ash, salt, calcium carbonate and potassium chlorid, and then subjecting the treated material to heat.

3. The herein described process which consists in forming a solution of water, sodium nitrate, soda ash, salt, calcium carbonate and potassium chlorid, then impregnating granulated, porous, carbonaceous material in the solution, then separating the impregnated material from the solution, and finally subjecting the treated material to heat to evaporate the water without changing to a gas any of the remaining ingredients of the solution impregnated in the material.

4. The herein described process which consists in forming a solution of water, sodium nitrate, soda ash, salt, calcium carbonate and potassium chlorid, then impregnating in said solution a granulated mixture of charcoal and coke, then draining or separating the solution from the mixture of charcoal and coke, and finally subjecting the mixture of charcoal and coke to heat to evaporate the water.

In testimony whereof I affix my signature.

NOAH B. RADABAUGH.